US012030314B2

(12) United States Patent
Wong et al.

(10) Patent No.: US 12,030,314 B2
(45) Date of Patent: Jul. 9, 2024

(54) LIQUID EJECTION HEAD

(71) Applicant: TOSHIBA TEC KABUSHIKI KAISHA, Tokyo (JP)

(72) Inventors: Meng Fei Wong, Mishima Shizuoka (JP); Yuji Shinomiya, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 101 days.

(21) Appl. No.: 17/841,634

(22) Filed: Jun. 15, 2022

(65) Prior Publication Data

US 2023/0202172 A1 Jun. 29, 2023

(30) Foreign Application Priority Data

Dec. 23, 2021 (JP) ................................ 2021-209471

(51) Int. Cl.
*B41J 2/14* (2006.01)
*B41J 2/045* (2006.01)
*B41J 2/175* (2006.01)

(52) U.S. Cl.
CPC ....... *B41J 2/14201* (2013.01); *B41J 2/04588* (2013.01); *B41J 2/17596* (2013.01)

(58) Field of Classification Search
CPC ............... B41J 2/17596; B41J 2/04588; B41J 2/14209; B41J 2/04596; B41J 2/14201; B41J 2/04508; B41J 2/04595; B41J 2202/08; B41J 2002/14491
See application file for complete search history.

(56) References Cited

U.S. PATENT DOCUMENTS

2018/0072055 A1 3/2018 Kiji
2021/0283905 A1 9/2021 Mawatari et al.
2021/0354452 A1 11/2021 Wong et al.

FOREIGN PATENT DOCUMENTS

JP 2016-087801 A 5/2016

OTHER PUBLICATIONS

Extended European Search Report mailed May 16, 2023 in corresponding European Patent Application No. 22188731.8, 8 pages.

*Primary Examiner* — An H Do
(74) *Attorney, Agent, or Firm* — Kim & Stewart LLP

(57) ABSTRACT

A liquid ejection head includes a nozzle for ejecting a droplet of a liquid, a pressure chamber connected to the nozzle, an actuator for changing a volume of the chamber according to a voltage signal, and a drive circuit generating the signal for ejecting n droplets, where n is an integer of 3 or more. The signal includes (n−1) ejection pulses, comprising a first pulse lowering the voltage signal to a first value to expand the chamber and then to a second value to contract the chamber, and a second pulse lowering the voltage signal to the first value and then to a third value higher than the second value. The pulses are input at intervals of 0.8λ to 1.2λ, where λ is a primary natural vibration period of the chamber filled with the liquid.

17 Claims, 13 Drawing Sheets

LIQUID EJECTION HEAD

CROSS-REFERENCE TO RELATED APPLICATION

This application is based upon and claims the benefit of priority from Japanese Patent Application No. 2021-209471, filed Dec. 23, 2021, the entire contents of which are incorporated herein by reference.

FIELD

Embodiments described herein relate generally to a liquid ejection head and an image forming apparatus having a liquid ejection head.

BACKGROUND

In recent years, improved printing performance with regard to such things as higher image quality, higher resolution, higher productivity (e.g., throughput), as well an increase in the amount of liquid droplets have been required in liquid ejection apparatuses, such as an ink jet head for printers.

In order to realize higher printing speeds and ejection of a large amount of droplets, a technique for supplying a drive signal including a plurality of ejection pulses for ejecting ink droplets within one printing period with an intermediate voltage as a reference is known. In order to suppress residual vibration generated by such an ejection pulse, a drive waveform including an expansion component that causes a pressure chamber to expand in volume after a final ejection pulse and a contraction component that contracts the pressure chamber after the expansion and returns the voltage of the drive signal to an intermediate voltage can be adopted.

In such an ink jet head, increasing the gradation expression range (an aspect of print quality) and the stability of ejection are required.

DETAILED DESCRIPTION

Embodiments provide a liquid ejection head capable of expanding the gradation expression range and ensuring the stability of ejection.

In general, according to one embodiment, a liquid ejection head includes a nozzle from which a droplet of a liquid can be ejected, a pressure chamber connected to the nozzle, an actuator configured to change a volume of the pressure chamber according to a voltage signal applied thereto, and a drive circuit configured to generate the voltage signal when droplets are to be ejected n times, where n is an integer of 3 or more. The voltage signal includes (n−1) ejection pulses, comprising at least one first ejection pulse that lowers a voltage applied to the actuator to a first voltage value to expand the pressure chamber and then raises the voltage to a second voltage value to contract the pressure chamber, and at least one second ejection pulse that lowers the voltage to the first voltage value and then raises the voltage to a third voltage value higher than the second voltage value. The ejection pulses are spaced at intervals of 0.8λ to 1.2λ, where λ is a period of a primary natural vibration of the pressure chamber filled with the liquid.

Figure 1:
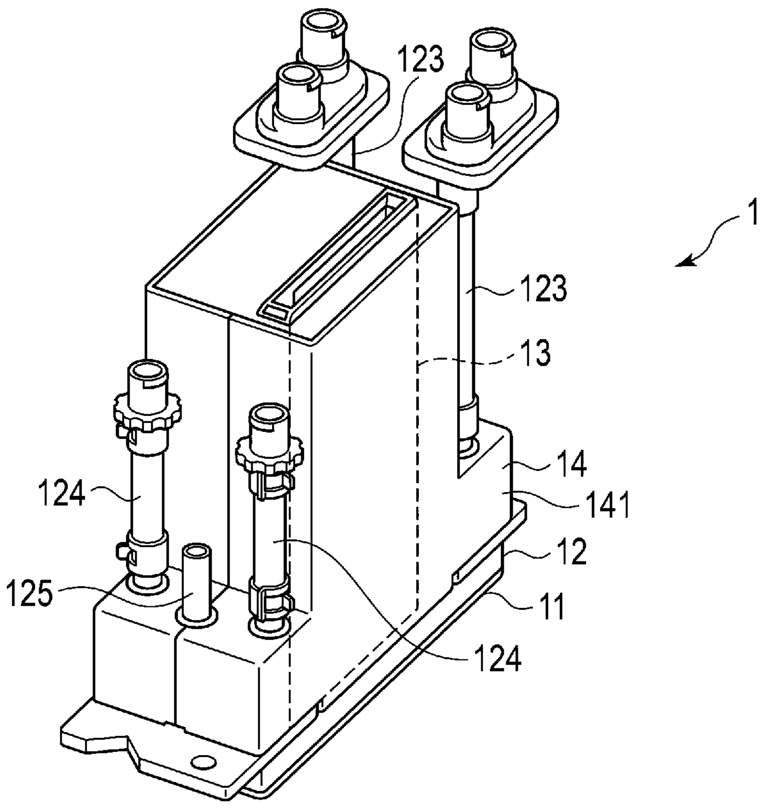
FIG. 1 is a perspective view illustrating a liquid ejection head according to an embodiment.
Figure 2:
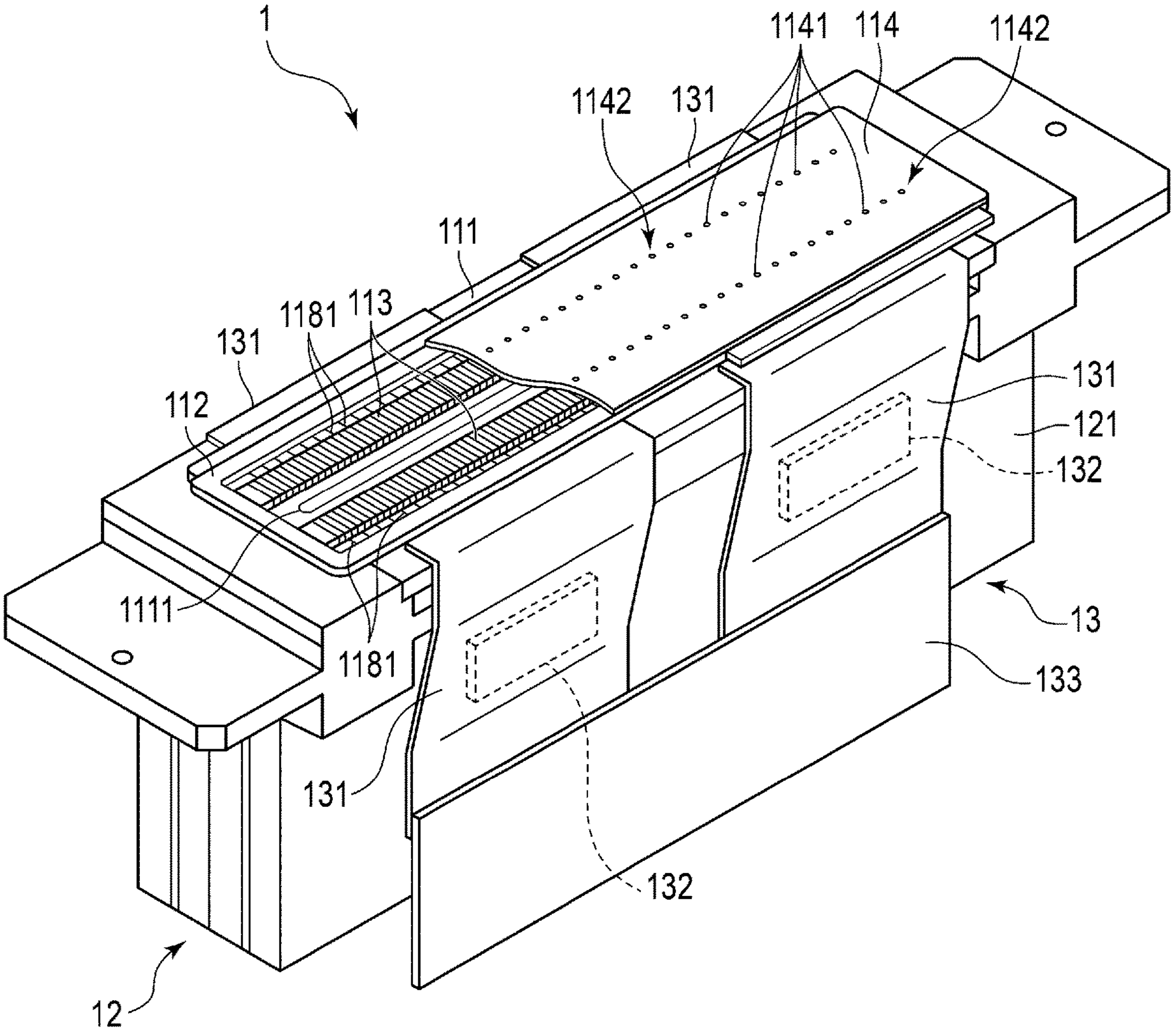
FIG. 2 is a perspective view illustrating a head body of a liquid ejection head.
Figure 3:
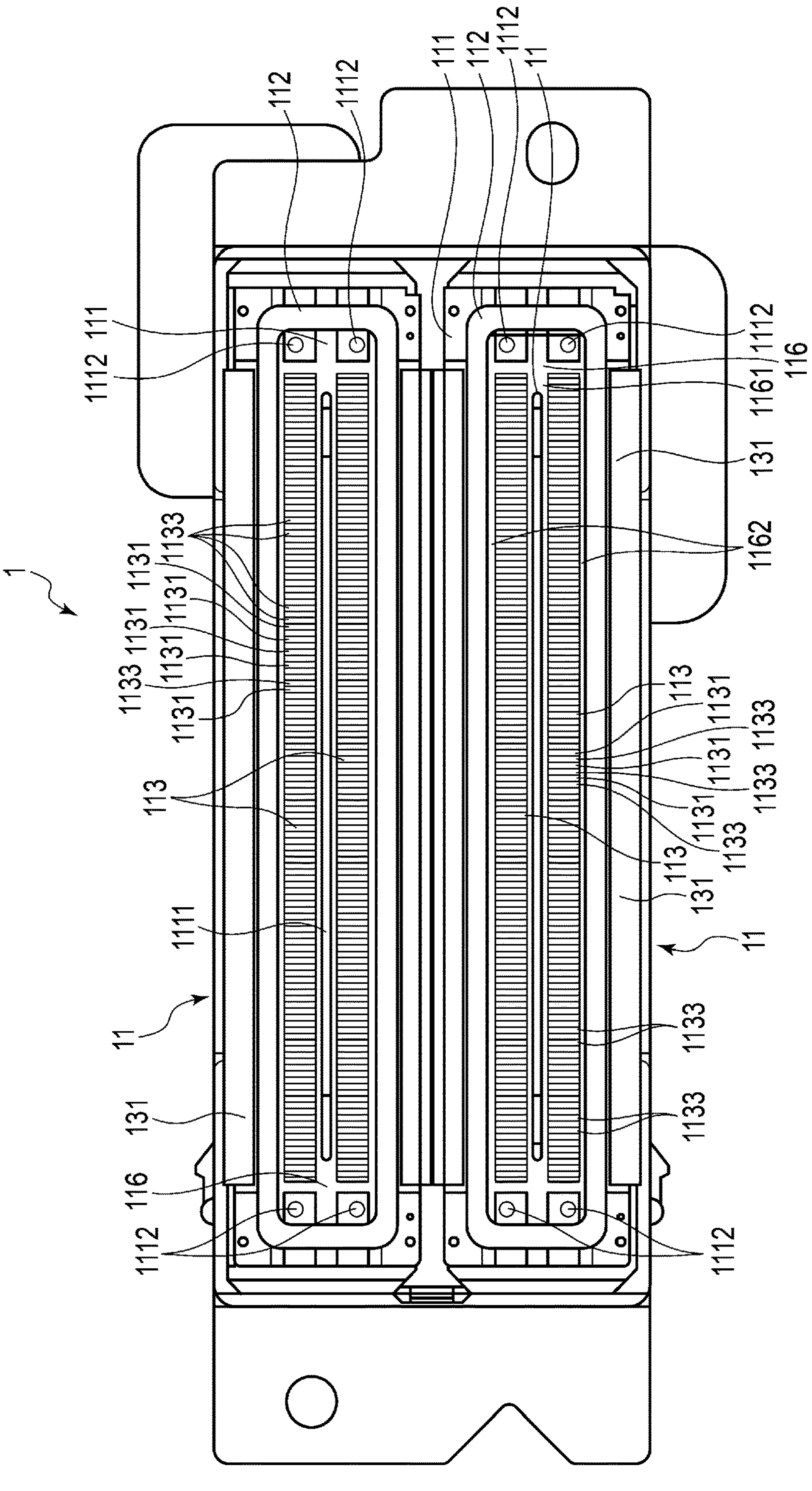
FIG. 3 is a bottom view illustrating a liquid ejection head.
Figure 4:
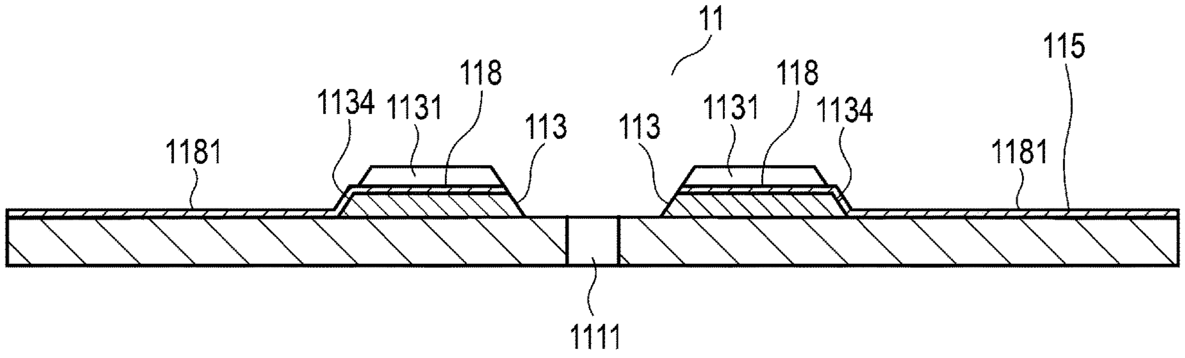
FIG. 4 is a cross-sectional view illustrating a head body of a liquid ejection head.
Figure 5:
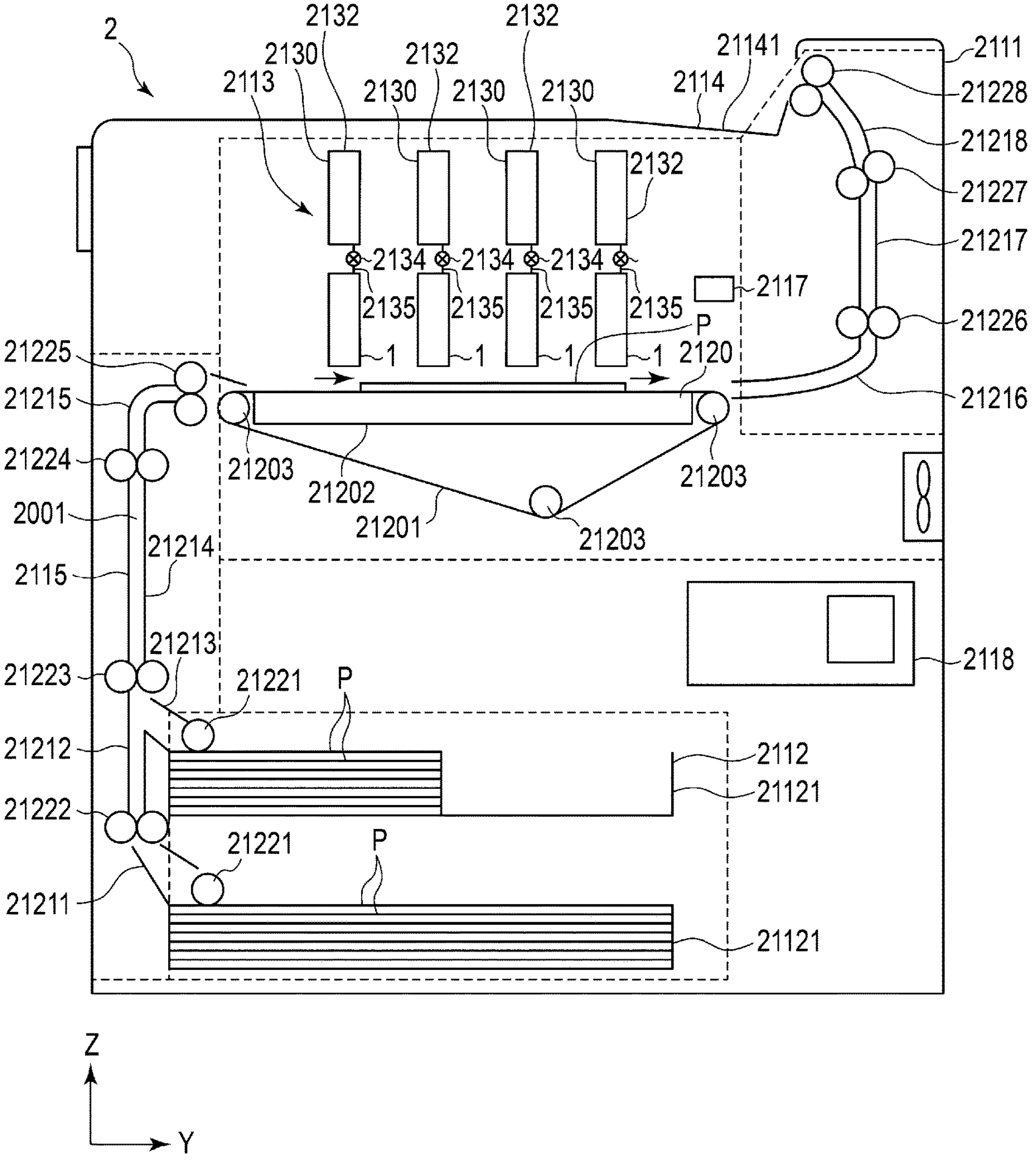
FIG. 5 is a diagram illustrating a liquid ejection apparatus according to an embodiment.

Hereinafter, a liquid ejection head 1 and a liquid ejection apparatus 2 incorporating the liquid ejection head 1 according to an embodiment will be described with reference to FIGS. 1 to 5. FIG. 1 is a perspective view illustrating the liquid ejection head 1. FIG. 2 is a perspective view illustrating a head body 11 of the liquid ejection head 1 in which a part of a nozzle plate 114 is cut away to show internal aspects of the liquid ejection head 1. FIG. 3 is a bottom view illustrating the liquid ejection head 1 in which the nozzle plate 114 is omitted to show other aspects. FIG. 4 is a cross-sectional view illustrating the head body 11. FIG. 5 is a diagram illustrating the liquid ejection apparatus 2 using the liquid ejection head 1. For aiding description, parts of the liquid ejection head 1 or the liquid ejection apparatus 2 may be enlarged, reduced, or omitted as appropriate.

The liquid ejection head 1 is a shear-mode, shared wall type ink jet head provided in a liquid ejection apparatus 2 such as the ink jet recording device illustrated in FIG. 5. The liquid ejection head 1 is provided in a head unit 2130, which includes a supply tank 2132 (liquid storage unit).

The liquid ejection head 1 is supplied with ink from the supply tank 2132. The liquid ejection head 1 may be a non-circulating type head that does not circulate ink between the liquid ejection head 1 and the supply tank 2132, or may be a circulating type head that circulates ink between the between the liquid ejection head 1 and the supply tank 2132. In this example, the liquid ejection head 1 is a non-circulating type head.

As illustrated in FIG. 1, the liquid ejection head 1 includes a head body 11, a manifold unit 12, a drive circuit 13, and a cover 14. For example, the liquid ejection head 1 is a side shooter type four-row integrated structure head including two pairs of head bodies 11 each of which has a pair of actuators 113.

The head body 11 ejects the liquid (e.g., ink). The head body 11 includes a substrate 111, a frame body 112, an actuator 113, and a nozzle plate 114. The actuator 113 has a plurality of pressure chambers 1131.

The head body 11 includes a common liquid chamber 116 that communicates with (connects to) the plurality of pressure chambers 1131 of an actuator 113. The primary side of the plurality of pressure chambers 1131 is an upstream side with respect to the direction in which the liquid flows from the supply tank 2132 for ejection. The secondary side of the plurality of pressure chambers 1131 is a downstream side.

The head body 11 includes a plurality of individual electrodes 118 on the substrate 111 and the actuator 113 for driving the plurality of pressure chambers 1131.

In this example, the head body 11 includes two actuators 113, and one first common liquid chamber 1161 and two second common liquid chambers 1162 for each actuator 113. The common liquid chamber 116 for an actuator 113 comprises a first common liquid chamber 1161, which communicates with openings (inlets) on the primary side of the plurality of pressure chambers 1131 of the actuator 113 and two second common liquid chambers 1162 (on opposite sides of the first common liquid chamber 1161) that communicates with openings (outlets) on the secondary side of the plurality of pressure chambers 1131 of the actuator 113.

The substrate 111 is, for example, a ceramic material formed in a rectangular plate shape. The substrate 111 is, for example, a rectangular shape that is long in one direction.

A wiring 1181 forming a part of the plurality of individual electrodes 118 is formed on a wiring surface 115, which is one surface of the substrate 111. The wiring of the substrate 111 is formed of, for example, a nickel thin film. The wiring 1181 has a predetermined pattern shape connected to a wiring formed in the actuator 113.

A pair of actuators 113 are provided to be aligned in the lateral direction of the substrate 111. The substrate 111 has a single supply port 1111 and a plurality of discharge ports 1112. The supply port 1111 and the discharge ports 1112 are through-holes penetrating between both main surfaces of the substrate 111.

The supply port 1111 is an inlet for supplying ink to the first common liquid chamber 1161. The supply port 1111 is a through-hole formed in the center of the substrate 111 in the lateral direction. The supply port 1111 extends along the longitudinal direction of the substrate 111. In other words, the supply port 1111 is, for example, a long hole (e.g., a slot or groove shape) that is long in one direction along the longitudinal direction of the actuator 113 and the longitudinal direction of the first common liquid chamber 1161. The supply port 1111 is provided between the pair of actuators 113 and opens at a position facing the first common liquid chamber 1161.

The discharge port 1112 is an outlet for discharging ink from the second common liquid chamber 1162. A plurality of discharge ports 1112, for example, four discharge ports, are provided. Each discharge port 1112 is located between the first common liquid chamber 1161 and one of the second common liquid chamber 1162. A discharge port 1112 is adjacent to each end in the longitudinal direction of each of the pair of actuators 113. In some examples, the discharge ports 1112 may be provided in the second common liquid chambers 1162.

The frame body 112 is fixed to one main surface of the substrate 111 with an adhesive or the like. The frame body 112 surrounds the supply port 1111, the plurality of discharge ports 1112, and the actuator 113 that are provided on the substrate 111.

For example, the frame body 112 is formed in a rectangular frame shape. The pair of actuators 113, the supply port 1111, and four discharge ports 1112 are disposed in the opening of the frame body 112.

The pair of actuators 113 are adhered to a mounting surface of the substrate 111. The pair of actuators 113 are aligned in two rows with the supply port 1111 interposed therebetween. Each actuator 113 is formed in a plate shape that is long in one direction. Each actuator 113 is disposed in the opening of the frame body 112 and adhered to the main surface of the substrate 111.

As illustrated in FIG. 3, an actuator 113 includes a plurality of pressure chambers 1131 disposed at equal intervals in the longitudinal direction in two rows.

The top surface portion of the actuator 113, which is a surface opposite to the substrate 111, is adhered to the nozzle plate 114. The actuators 113 are disposed to be aligned at equal intervals in the longitudinal direction, and each of the actuators 113 is formed with a plurality of grooves along a direction orthogonal to the longitudinal direction. The plurality of grooves form the plurality of pressure chambers 1131. In other words, the actuator 113 includes a plurality of piezoelectric columns 1133 (walls) at equal intervals in the longitudinal direction and are drive elements that are the walls between the grooves. The adjacent piezoelectric columns 1133 form of the sidewalls of a pressure chambers 1131, and a volume of the pressure chamber 1131 can be changed by applying a driving voltage to the piezoelectric columns 1133. That is, the actuator 113 changes the volume of a pressure chamber 1131 according to an electric signal applied to the piezoelectric columns 1133 (walls) of the respective pressure chamber 1131.

For example, a width of the actuator 113 in the lateral direction gradually increases from the top side toward the substrate 111 side. A cross-sectional shape of a cross section along the direction orthogonal to the longitudinal direction of the actuator 113 is formed into a trapezoidal shape. That is, the actuator 113 has an inclined surface 1134 that is inclined to a side surface portion in the lateral direction. The side surface portion (inclined surface 1134) is disposed so as to face the first common liquid chamber 1161 and the second common liquid chamber 1162.

A pressure chamber 1131 can be deformed so that ink is ejected from the nozzle 1141 for printing by the liquid ejection head 1. Each pressure chamber 1131 has an inlet that opens to the first common liquid chamber 1161 and an outlet that opens to a second common liquid chamber 1162. Ink flows into the pressure chamber 1131 from the inlet and out from the outlet. In some examples, the pressure chamber 1131 may be configured such that ink flows in from openings at both ends of the pressure chamber 1131 rather than having either end serve as an outlet.

The nozzle plate 114 is formed in a plate shape. The nozzle plate 114 is fixed to the frame body 112 on the side opposite from the substrate 111 with an adhesive or the like. The nozzle plate 114 has a plurality of nozzles 1141 formed at positions facing the plurality of pressure chambers 1131. In an embodiment, the nozzle plate 114 includes two nozzle rows 1142 in which a plurality of nozzles 1141 are aligned.

The first common liquid chamber 1161 is formed between the central sides of the pair of actuators 113 except for both ends of the pair of actuators 113, and forms an ink flow path from the supply port 1111 to the openings (inlets) on the primary side of the pressure chambers 1131 of each actuator 113. The first common liquid chamber 1161 extends along the longitudinal direction of the actuator 113.

Each of the second common liquid chambers 1162 is formed between an actuator 113 and the frame body 112. Each of the second common liquid chambers 1162 forms an ink flow path from the openings (outlets) on the secondary side of the plurality of pressure chambers 1131 to the discharge port 1112. The second common liquid chambers 1162 extend along the longitudinal direction of the actuator 113.

The plurality of individual electrodes 118 are electrodes that can be used to individually apply a driving voltage to the plurality of piezoelectric columns 1133. The individual electrodes 118 may be used to individually deform any particular one of the pressure chambers 1131. Each electrode 118 comprises the wiring portions that are formed on the actuator 113 and on the substrate 111.

Each individual electrode 118 is drawn out from the inner surface of the pressure chamber 1131 to the inclined surface 1134 and the wiring surface 115 of the substrate 111, extends to the end in the lateral direction of the substrate 111, and is connected to the drive circuit 13. The individual electrodes 118 are formed of, for example, a nickel thin film. The individual electrodes 118 are not limited to being a nickel thin film, and may be formed of, for example, a thin film of gold or copper. A part of each electrode 118 may be covered with an adhesive that is used to adhere the bottom surface of the frame body 112 to the substrate 111.

Each individual electrode 118 is connected to drive circuit 13. For example, the individual electrodes 118 can be connected to a control unit 2118 via a driver in the drive circuit 13 by a wiring. The individual electrodes 118 and the drive circuit 13 configured so that individual electrodes 118 may be addressable/controllable by a processor.

As illustrated in FIGS. 1 and 3, the manifold unit 12 includes a manifold 121, ink supply pipes 123, ink discharge pipes 124, and a pair of temperature control pipes of a temperature control water supply pipe 125 and a temperature control water discharge pipe. The numbers of the ink supply pipes 123, the ink discharge pipes 124, the temperature control water supply pipes 125, and the temperature control water discharge pipes can be appropriately set.

The manifold 121 is formed in a plate shape or a block shape. The manifold 121 includes a supply flow path, which is continuous with the supply port 1111 of the substrate 111 and forms a liquid supply flow path, a discharge flow path, which is continuous with the discharge port 1112 of the substrate 111 and forms a liquid discharge flow path, and a temperature control flow path which forms a fluid flow path for temperature control.

One main surface of the manifold 121 is fixed to the main surface of the substrate 111. For example, the ink supply pipe 123, the ink discharge pipe 124, the temperature control water supply pipe 125, and the temperature control water discharge pipe are fixed to the manifold 121.

The supply flow path is formed in the manifold 121 by holes and grooves. The supply flow path fluidly connects the ink supply pipe 123 and the supply port 1111 of the substrate 111.

The discharge flow path is formed in the manifold 121 by holes and grooves. The discharge flow path fluidly connects the ink discharge pipe 124 and the discharge port 1112 of the substrate 111.

The temperature control flow path is formed in the manifold 121 by holes and grooves. The temperature control flow path fluidly connects the temperature control water supply pipe 125 and the temperature control water discharge pipe.

The temperature control flow path has openings connected to the temperature control water supply pipe 125 at one end and the temperature control water discharge pipe at the other. The temperature control flow path is capable of heat exchange with the substrate 111 fixed to the manifold 121.

The ink supply pipe 123 is connected to the supply flow path. The ink discharge pipe 124 is connected to the discharge flow path. The temperature control water supply pipe 125 and temperature control water discharge pipe are connected to the primary side and the secondary side of the temperature control flow path, respectively.

As illustrated in FIG. 2, the drive circuit 13 includes wiring films 131, each of which has one end connected to the substrate 111, driver ICs 132 mounted on the wiring film 131, and a printed wiring board 133 mounted on the other end of each wiring film 131.

The drive circuit 13 drives the actuator 113 by applying a drive voltage to a wiring pattern of the actuator 113 by the driver IC 132 to increase or decrease the volume of the pressure chamber 1131 and eject droplets from the nozzle 1141.

The wiring film 131 is connected to the plurality of individual electrodes 118. For example, the wiring film 131 is an anisotropic conductive film (ACF) fixed to a connection portion of the substrate 111 by thermos-compression bonding or the like. A plurality of wiring films 131 to be connected are provided for, for example, one head body 11. In an embodiment, two wiring films 131 are connected to one actuator 113. The wiring film 131 is, for example, a chip-on-film (COF) on which the driver IC 132 is mounted.

The driver IC 132 is connected to the plurality of individual electrodes 118 via the wiring film 131. The driver IC 132 may be connected to the plurality of individual electrodes 118 by other means such as combination of an anisotropic conductive paste (ACP), a non-conductive film (NCF), and a non-conductive paste (NCP) instead of the wiring film 131.

The driver IC 132 generates a control signal and a drive signal for operating the piezoelectric column 1133 as each drive element. The driver IC 132 generates a control signal for control such as selecting the timing for ejecting ink and the piezoelectric column 1133 for ejecting ink according to an image signal input from the control unit 2118 of the liquid ejection apparatus 2. The driver IC 132 generates a voltage applied to the piezoelectric column 1133 according to the control signal, that is, a drive signal. If the driver IC 132 applies the drive signal (voltage) to the piezoelectric column 1133, the piezoelectric column 1133 is driven so as to change the volume of the pressure chamber 1131. With this configuration, ink inside the pressure chamber 1131 can be ejected from the nozzle 1141 corresponding to the pressure chamber 1131. The liquid ejection head 1 may be capable of changing the amount (e.g., number) of ink droplets that land for printing one pixel for purposes of gradation expression (e.g., providing different levels of color saturation or shading). The liquid ejection head 1 may be capable of changing the amount of ink droplets that land on each pixel by changing the number of times the ink is ejected. Thus, the driver IC 132 applies the drive signal to the piezoelectric column 1133 as appropriate.

For example, the driver IC 132 includes a data buffer, a decoder, and a driver. The data buffer stores print data in chronological order on a per piezoelectric column 1133 basis. The decoder controls the driver based on the print data stored in the data buffer on the per piezoelectric column 1133 basis. The driver outputs a drive signal to operate each piezoelectric column 1133 under the control of the decoder. The drive signal is the voltage applied to each piezoelectric column 1133.

The printed wiring board 133 is a printed wiring assembly (PWA) on which various electronic components and connectors are mounted.

The cover 14 includes, for example, an outer shell 141 that covers the side surfaces of the pair of head bodies 11, the manifold unit 12, and the drive circuit 13, and a mask plate that covers a part of the pair of head bodies 11 on the nozzle plate 114 side.

The outer shell 141 leaves exposed to the outside the ink supply pipe 123, the ink discharge pipe 124, the temperature control water supply pipe 125 and the temperature control water discharge pipe, and the end portion of the drive circuit 13.

The mask plate covers a portion of the pair of head bodies 11 excluding the plurality of nozzles 1141 and the periphery of the plurality of nozzles 1141 of the nozzle plate 114.

Hereinafter, the liquid ejection apparatus 2 including the liquid discharge head 1 will be described with reference to FIG. 5. The liquid ejection apparatus 2 includes a casing 2111, a paper supply unit 2112, an image forming unit 2113, a paper discharge unit 2114, a conveyance device 2115, a maintenance device 2117, and a control unit 2118. The liquid ejection apparatus 2 includes a temperature control device that adjusts the temperature of ink supplied to the liquid ejection head 1.

The liquid ejection apparatus 2 is an ink jet printer that performs an image forming processing on paper P by ejecting a liquid, such as an ink, onto the paper P as a recording medium while the paper P is conveyed along a predetermined conveyance path 2001 from the paper supply unit 2112 through the image forming unit 2113 to the paper discharge unit 2114.

The paper supply unit 2112 includes a plurality of paper feed cassettes 21121. The image forming unit 2113 includes a support portion 2120 that supports paper, and a plurality of head units 2130 that are disposed so as to face each other above the support portion 2120. The paper discharge unit 2114 includes a paper discharge tray 21141.

The support portion 2120 includes a conveyance belt 21201 provided in a loop shape in a predetermined area for which image formation is performed, a support plate 21202 for supporting the conveyance belt 21201 from the back side, and a plurality of belt rollers 21203 provided on the back side of the conveyance belt 21201.

The head units 2130 include the liquid ejection heads 1 which are a plurality of ink jet heads, a plurality of supply tanks 2132 as liquid tanks mounted on the liquid ejection heads 1, and pumps 2134 for supplying ink, connection flow paths 2135 for connecting the liquid ejection heads 1 and the supply tanks 2132.

In an embodiment, the liquid ejection heads 1 eject ink of four colors of cyan, magenta, yellow, and black, and include the supply tanks 2132 for storing ink of these colors. The supply tank 2132 is connected to the liquid ejection head 1 by the connection flow path 2135.

The pump 2134 is a liquid feed pump such as a piezoelectric pump. The pump 2134 is connected to the control unit 2118 and is driven and controlled by the control unit 2118.

The connection flow path 2135 includes a supply flow path connected to the ink supply pipe 123 of the liquid ejection head 1. The connection flow path 2135 includes a recovery flow path connected to the ink discharge pipe 124 of the liquid ejection head 1. For example, if the liquid ejection head 1 is a non-circulating type liquid ejection head, the recovery flow path is connected to the maintenance device 2117, and if the liquid ejection head 1 is a circulating type liquid ejection head, the recovery flow path is connected to the supply tank 2132.

The conveyance device 2115 conveys paper P along the conveyance path 2001 from the paper feed cassette past the image forming unit 2113 to the paper discharge tray 21141. The conveyance device 2115 includes a plurality of guide plates (guide plate 21211, 21212, 21213, 21214, 21215, 21216, 21217, and 21218) and a plurality of conveyance rollers pairs (conveyance roller pairs 21221, 21222, 21223, 21224, 21225, 21226, 21227, and 21228) disposed along the conveyance path 2001. The conveyance device 2115 guides paper P past the liquid ejection heads 1 for printing.

The maintenance device 2117 suctions and recovers ink from the outer surface of the nozzle plate 114 during maintenance processing. If the liquid ejection head 1 is a non-circulating type liquid ejection head, the maintenance device 2117 also recovers ink stored in the head body 11 during maintenance processing. Such a maintenance device 2117 includes a tray, a tank, or the like for storing the recovered ink.

The control unit 2118 is, for example, a control board. A processor, a read only memory (ROM), a random access memory (RAM), an I/O port as an input and output port, and an image memory are mounted on the control unit 2118.

The processor is a processing circuit such as a central processing unit (CPU) which can be a controller. The processor controls the head unit 2130 provided in the liquid ejection apparatus 2, a drive motor, an operation panel, various sensors, and the like through the I/O port. The processor transmits print data stored in the image memory to the drive circuit 13 in a drawing order.

The ROM stores various programs and the like. The RAM temporarily stores various variable data, image data, and the like. The I/O port is an interface unit that receives data from the outside and outputs data to the outside. Print data from an externally connected device is transmitted to the control unit through the I/O port and stored in the image memory.

Hereinafter, characteristics of the liquid ejection head 1 used in the liquid ejection apparatus 2 according to an embodiment and a drive waveform by the drive signal generated by the drive circuit 13 of the liquid ejection head 1 will be described. For example, the drive waveform of the liquid ejection head 1 is a multi-drop drive, and includes an ejection waveform portion having a plurality of ejection pulses and a cancel waveform portion having a cancel pulse following the ejection waveform portion.

The ejection waveform portion includes a plurality of ejection pulses Pa, Pb, and Pc. Each of the ejection pulses Pa, Pb, and Pc includes an expansion element that lowers a voltage and a contraction element that raises the voltage following the expansion element. Then, in the drive waveform of the liquid ejection apparatus 2 according to an embodiment, an applying voltage in the contraction elements of the plurality of ejection pulses is set in two steps. That is, the drive waveform includes at least two contraction elements that pressurize at different voltages.

For example, if ink droplets are ejected n times (where n is an integer of 3 or more) to print three or more gradations, the ejection waveform portion includes (n−1) expansion elements that expand the pressure chamber by lowering the voltage to voltage Va from a first drop to an (n−1)-th drop with first intermediate voltage Vb as a reference, a contraction element that contracts the pressure chamber after each expansion element until the voltage reaches the first intermediate voltage Vb, which is an intermediate voltage, and ejects ink, and a contraction element that contracts the pressure chamber after the expansion element until the voltage reaches to a second intermediate voltage Vc higher than the first intermediate voltage Vb, and ejects ink. For example, the voltage Va=0 V.

In an embodiment, a print waveform including n ejection pulses and a cancel pulse in one printing period is within a time shorter than (n+1.5)λ. In the drive waveform in one embodiment, the print waveform including n ejection pulses and a cancel pulse in one printing cycle may be within a time shorter than (n+1)λ.

In the drive waveform according to an embodiment, the period of the primary natural vibration when the pressure chamber 1131 is filled with ink is λ, the centers of the ejection pulses Pa, Pb, and Pc and the center of the cancel pulse Pd are provided at a period of 0.8 to 1.2λ (λ±variation). The configuration of the entire drive waveform including the ejection waveform portion and the cancel waveform portion is shorter than (n+1)λ. By adopting such a configuration, the ejection of ink droplets in gradation printing can be stabilized to widen the range in which the size of ink droplets can be increased or decreased.

Example 1

Figure 6:
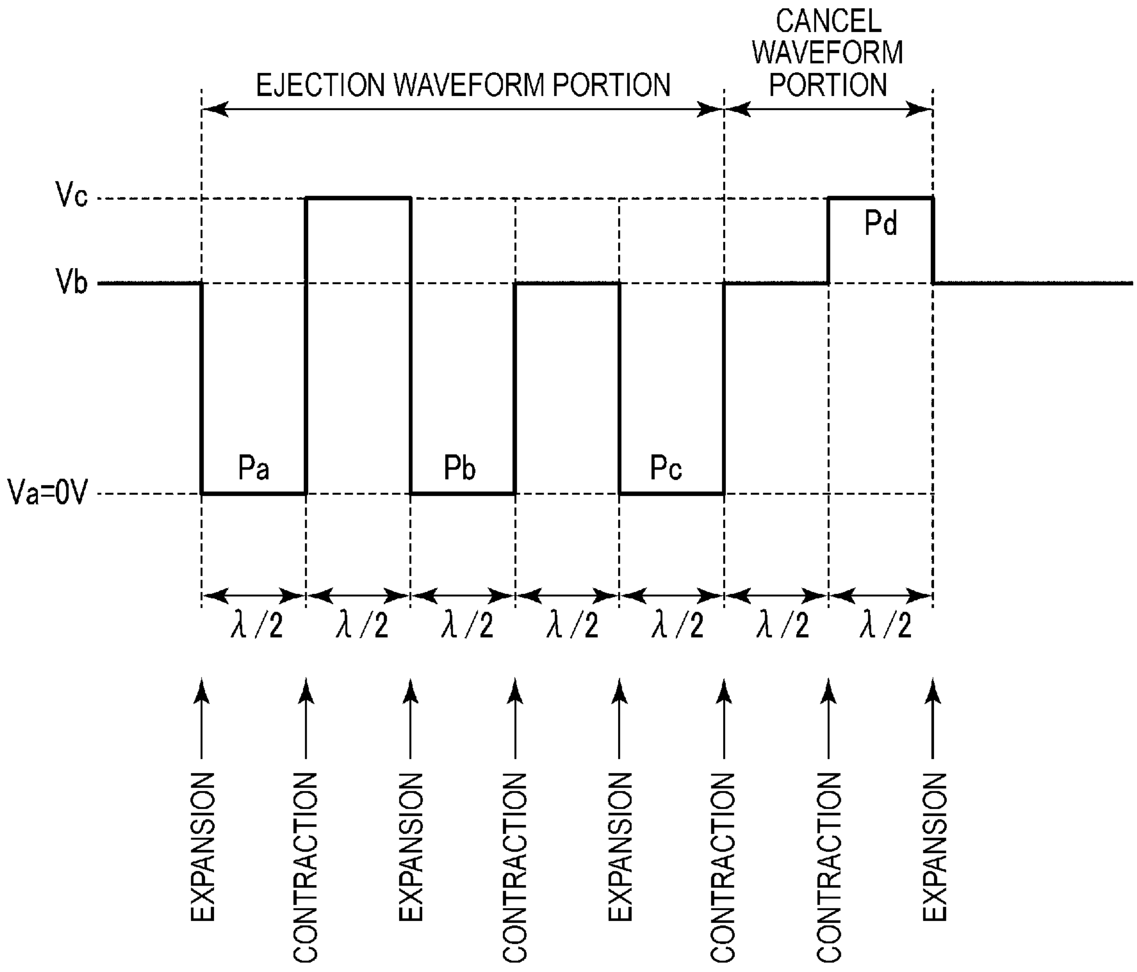
FIG. 6 depicts a drive waveform according to Example 1.

FIG. 6 illustrates the drive waveform according to Example 1. This drive waveform is a three-drop waveform, and three ejection pulses for expansion and contraction are aligned at a regular time period λ. Each of the three ejection pulses Pa, Pb, and Pc includes an expansion element that expands the pressure chamber 1131 to draw liquid into the pressure chamber 1131 and a contraction element that contracts the pressure chamber 1131 to eject the liquid. In this example, the first ejection pulse Pa includes an expansion element that lowers the voltage from the first intermediate voltage Vb to expansion voltage Va and a contraction element that raises the voltage to second intermediate voltage Vc higher than the first intermediate voltage Vb. For example, the second intermediate voltage Vc is larger than the first intermediate voltage Vb. That is, in this waveform, the first ejection pulse Pa lowers the voltage from the first intermediate voltage Vb to the expansion voltage Va (=0 V), and then raises the expansion voltage Va to the second intermediate voltage Vc (which is larger than the first intermediate voltage Vb). Then, in the second ejection pulse Pb, the second intermediate voltage Vc is lowered to the expansion voltage Va again and then raised to the first intermediate voltage Vb. In the third ejection pulse Pc, the first intermediate voltage Vb is lowered to the expansion voltage Va and then raised to the first intermediate voltage Vb again.

The cancel waveform portion of Example 1 has a cancel pulse Pd including a contraction element that raises the voltage from the first intermediate voltage Vb to a larger second intermediate voltage Vc following the final ejection pulse Pc, and then an expansion element that lowers the final ejection pulse Pc to the first intermediate voltage Vb. In this example, the plurality of ejection pulses Pa, Pb, and Pc and the cancel pulse Pd are aligned at a regular time period λ. In each of the ejection pulses Pa, Pb, and Pc, each of the periods from expansion to contraction and the period from contraction to expansion is λ/2. In the cancel pulse Pd, each of the periods from the contraction of the ejection pulse Pc to the contraction of the cancel pulse Pd and the period from the contraction to the expansion of the cancel pulse Pd is λ/2.

Figure 7:
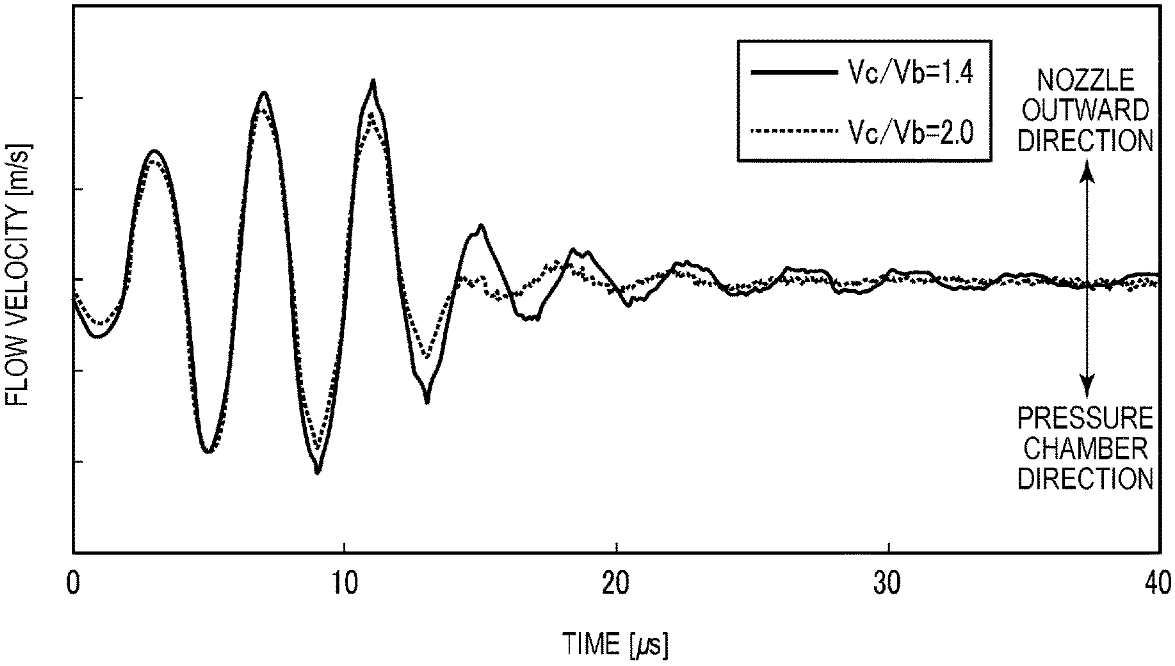
FIG. 7 is a graph illustrating simulation results of a flow velocity in Example 1.
Figure 8:
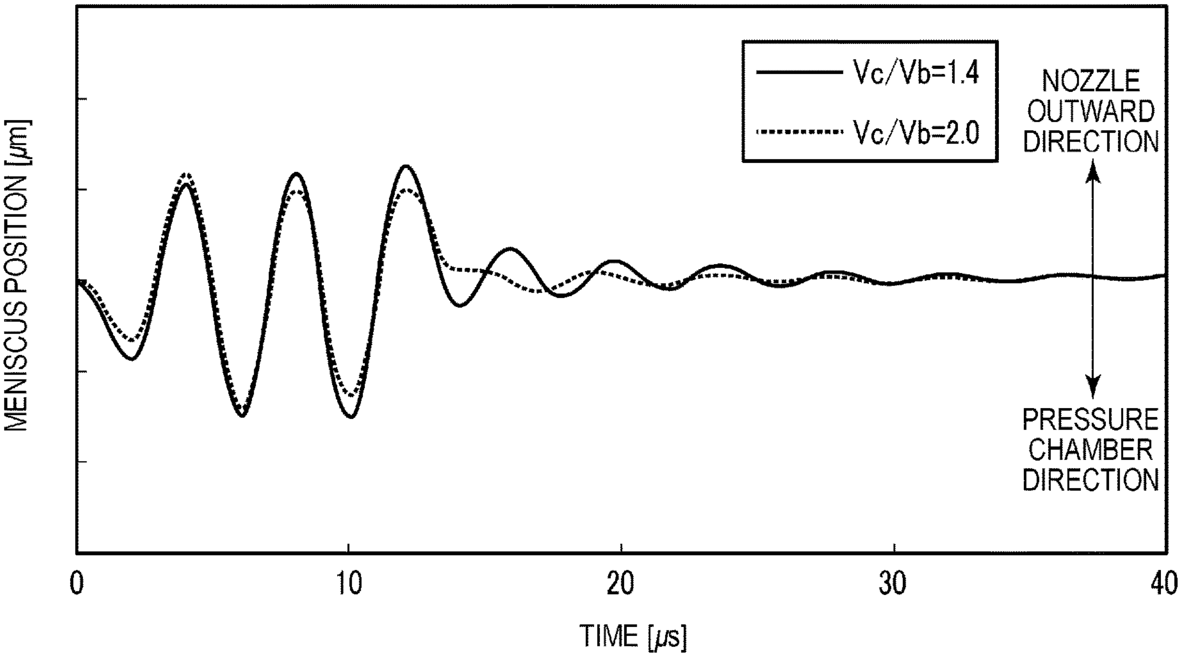
FIG. 8 is a graph illustrating simulation results of a meniscus position in Example 1.

FIGS. 7 and 8 illustrate simulation results if meniscus is operated at a voltage that does not cause ejection in Example 1. FIG. 7 illustrates a temporal change in the flow velocity if Vc/Vb is 1.4 and if Vc/Vb is 2.0. As a simulation condition, λ is set to 4 μs. FIG. 8 illustrates the temporal change in a meniscus position if Vc/Vb is 1.4 and if Vc/Vb is 2.0.

According to this example, stabilization of ink droplet ejection and expansion of the range of gradation can be achieved. As illustrated in FIGS. 7 and 8, residual vibration can be suppressed by adjusting a voltage ratio Vc/Vb.

Example 2

Figure 9:
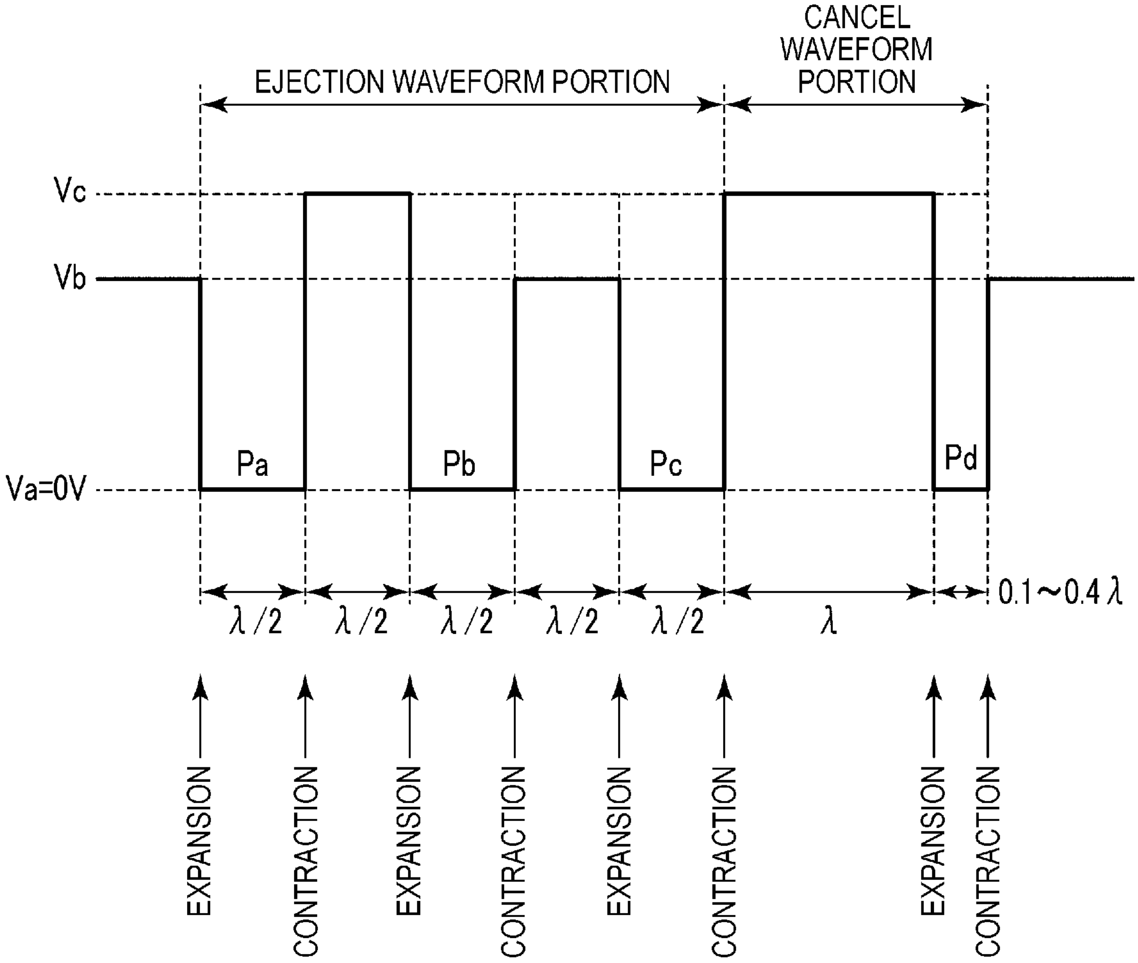
FIG. 9 depicts a drive waveform according to Example 2.

FIG. 9 illustrates the drive waveform according to Example 2. This drive waveform is a three-drop waveform, and three ejection pulses for expansion and contraction are aligned at a regular time period λ. Each of the three ejection pulses Pa, Pb, and Pc includes an expansion element that expands the pressure chamber 1131 to draw liquid into the pressure chamber 1131 and a contraction element that contracts the pressure chamber 1131 to eject the liquid. In this example, the first ejection pulse Pa includes an expansion element that lowers the voltage from the first intermediate voltage Vb to the expansion voltage Va and a contraction element that raises the voltage to the second intermediate voltage Vc higher than the first intermediate voltage Vb. For example, the second intermediate voltage Vc is larger than the first intermediate voltage Vb. That is, in this waveform, the first ejection pulse Pa lowers the voltage from the first intermediate voltage Vb to the expansion voltage Va (=0 V), and then raises the expansion voltage Va to the second intermediate voltage Vc which is larger than the first intermediate voltage Vb. Then, in the second ejection pulse Pb, the voltage is lowered to the expansion voltage Va again and then raised to the first intermediate voltage Vb. Furthermore, in the third ejection pulse Pc, the first intermediate voltage Vb is lowered to the expansion voltage Va and then raised to the second intermediate voltage Vc again. In this example, in the final ejection pulse, by raising the first intermediate voltage Vb to the second intermediate voltage Vc, which is the maximum voltage, and speeding up the final drop, a plurality of ejected drops can be combined.

The cancel waveform portion of Example 2 has a cancel pulse Pd including an expansion element that expands the contracted pressure chamber 1131 again by raising the first intermediate voltage Vb to the second intermediate voltage Vc higher than the first intermediate voltage Vb in the contraction element of the final ejection pulse Pc and changes the second intermediate voltage Vc to the expansion voltage Va lower than the first intermediate voltage Vb, and a contraction element that contracts the pressure chamber 1131 again and then returns the expansion voltage Va to the first intermediate voltage Vb.

In this example, the plurality of ejection pulses Pa, Pb, and Pc are aligned at a regular time period λ. In each of the ejection pulses Pa, Pb, and Pc, each of the periods from expansion to contraction and the period from contraction to expansion is λ/2. In the cancel waveform portion, the spacing from the contraction element of the ejection pulse Pc to the expansion element of the cancel pulse Pd is λ, and the period from the expansion to the contraction of the cancel pulse Pd is 0.1λ to 0.4λ.

Figure 10:
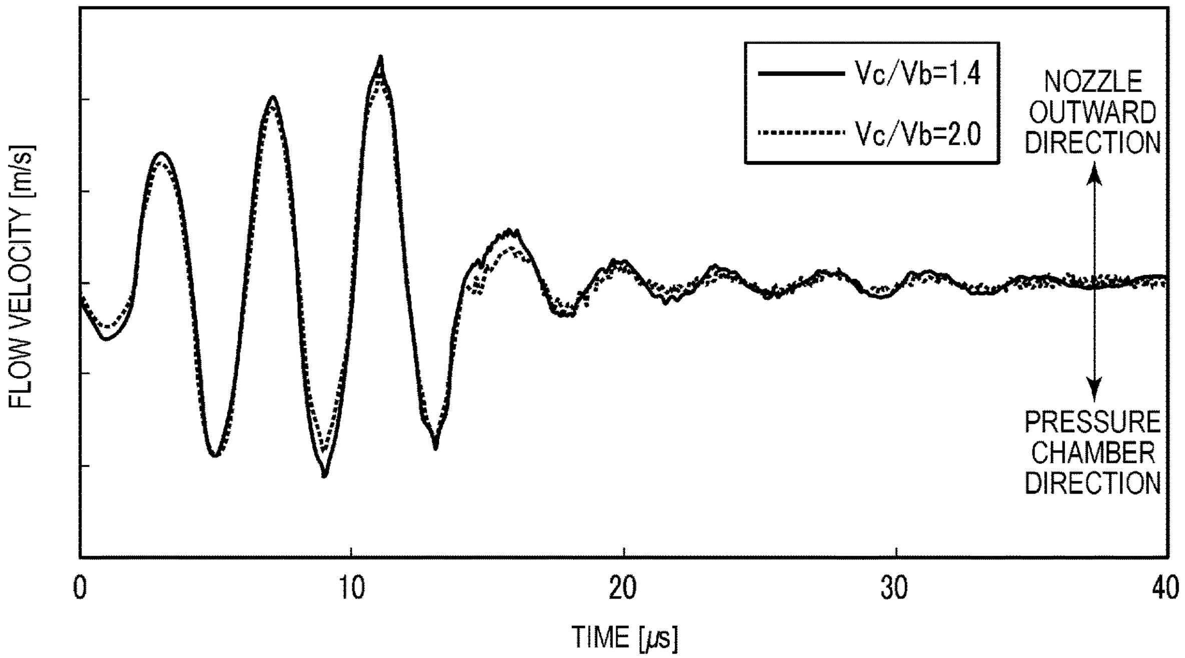
FIG. 10 is a graph illustrating simulation results of a flow velocity in Example 2.
Figure 11:
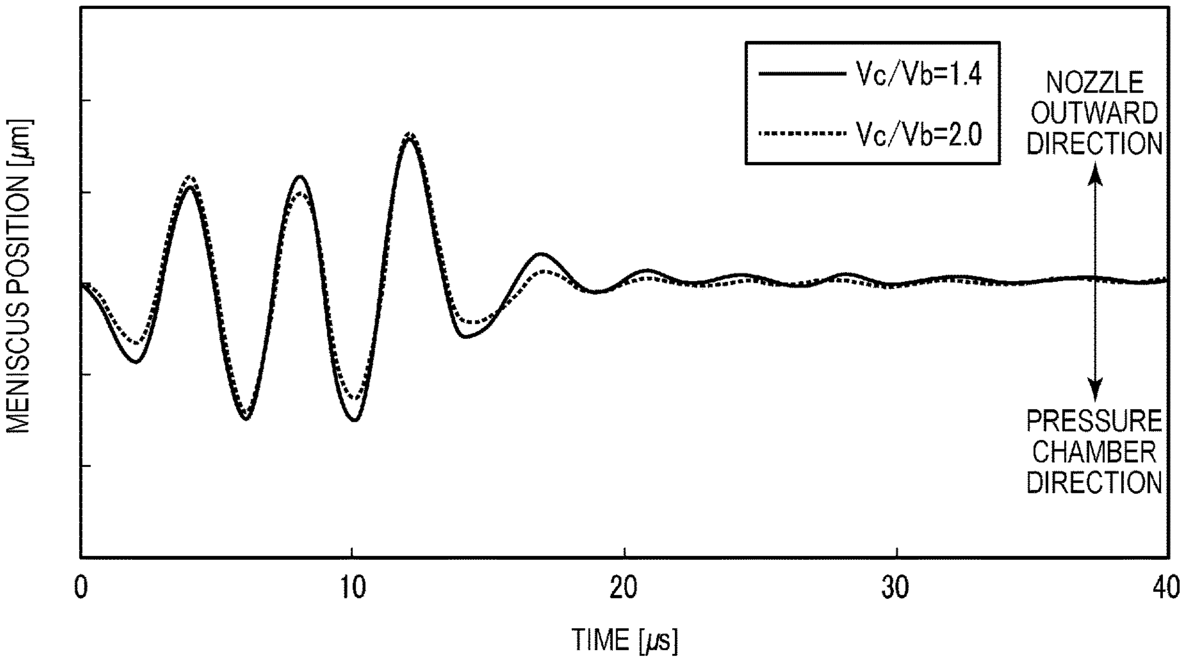
FIG. 11 is a graph illustrating simulation results of a meniscus position in Example 2.

FIGS. 10 and 11 illustrate simulation results if the meniscus is operated at a voltage that does not cause ejection in Example 2. FIG. 10 illustrates the temporal change in the flow velocity if Vc/Vb is 1.4 and if Vc/Vb is 2.0. As a simulation condition, λ is set to 4 μs. FIG. 11 illustrates the temporal change in the meniscus position if Vc/Vb is 1.4 and if Vc/Vb is 2.0.

According to this example, stabilization of ink droplet ejection and expansion of the range of gradation can be achieved. As illustrated in FIGS. 10 and 11, residual vibration can be suppressed by adjusting the voltage ratio Vc/Vb.

Example 3

Figure 12:
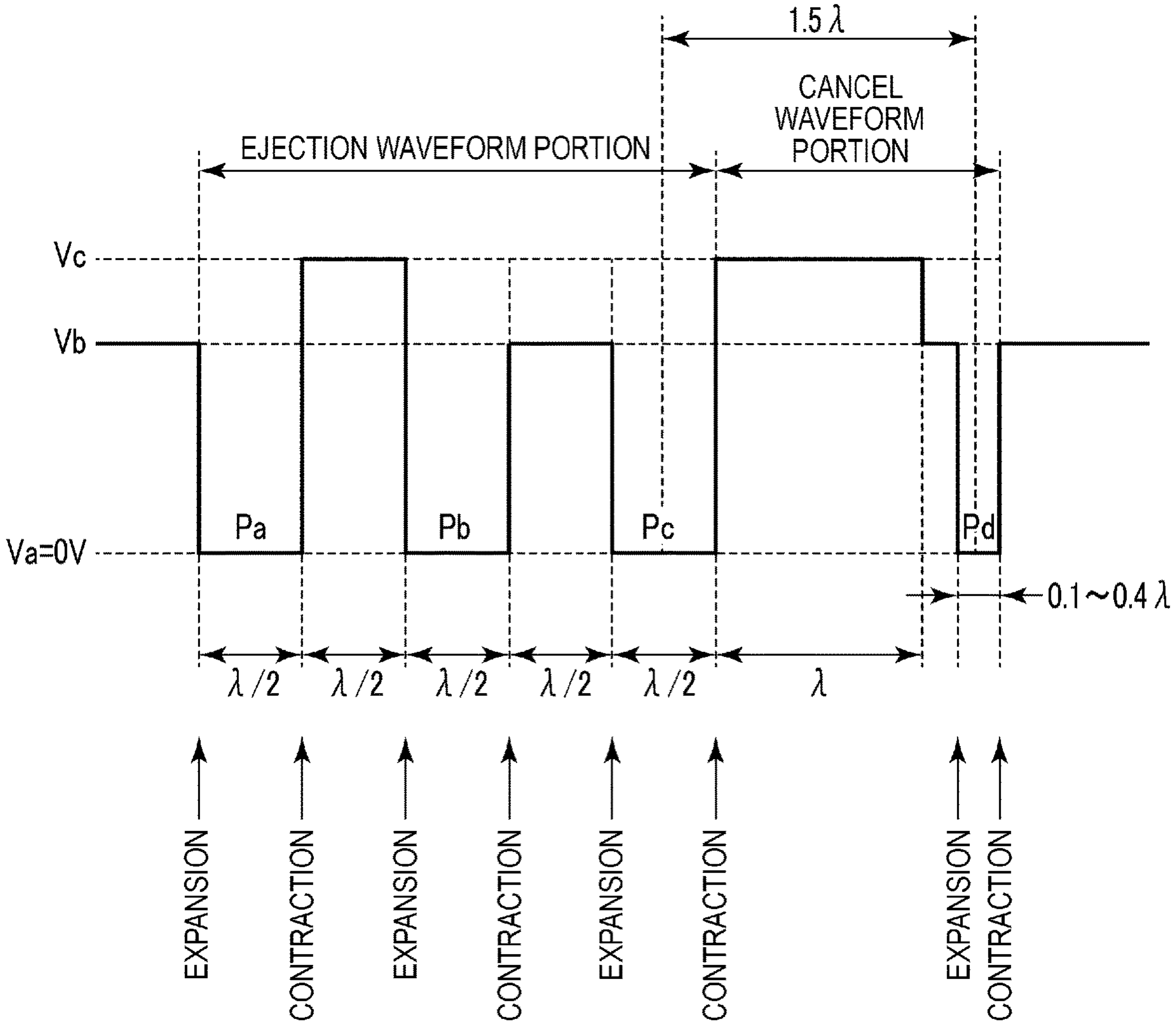
FIG. 12 depicts a drive waveform according to Example 3.

FIG. 12 illustrates the drive waveform of Example 3. The drive waveform of Example 3 is a modification example of the drive waveform of Example 2, and has a step waveform in which the timing of starting a part of the pulse of the cancel pulse portion is adjusted and the cancel pulse Pd is expanded in two steps.

The cancel waveform portion of Example 3 has a cancel pulse Pd that includes an expansion element including a step waveform that expands the pressure chamber 1131, which is contracted by raising the first intermediate voltage Vb to the second intermediate voltage Vc higher than the first intermediate voltage Vb in the contraction element of the final ejection pulse Pc, again to lower the second intermediate voltage Vc to the first intermediate voltage Vb, and subsequently further changes the first intermediate voltage Vb to the expansion voltage Va lower than the first intermediate voltage Vb and a contraction element that contracts the pressure chamber 1131 again and returns the expansion voltage Va to the first intermediate voltage Vb.

In the cancel waveform portion, the period from the contraction element of the final ejection pulse Pc to the expansion element of the cancel pulse Pd is λ, and the period from the expansion to the contraction of the cancel pulse Pd is 0.1λ to 0.4λ. Other waveforms are the same as in Example 2.

Also in this example, stabilization of ink droplet ejection and expansion of the range of gradation can be achieved.

Figure 13:
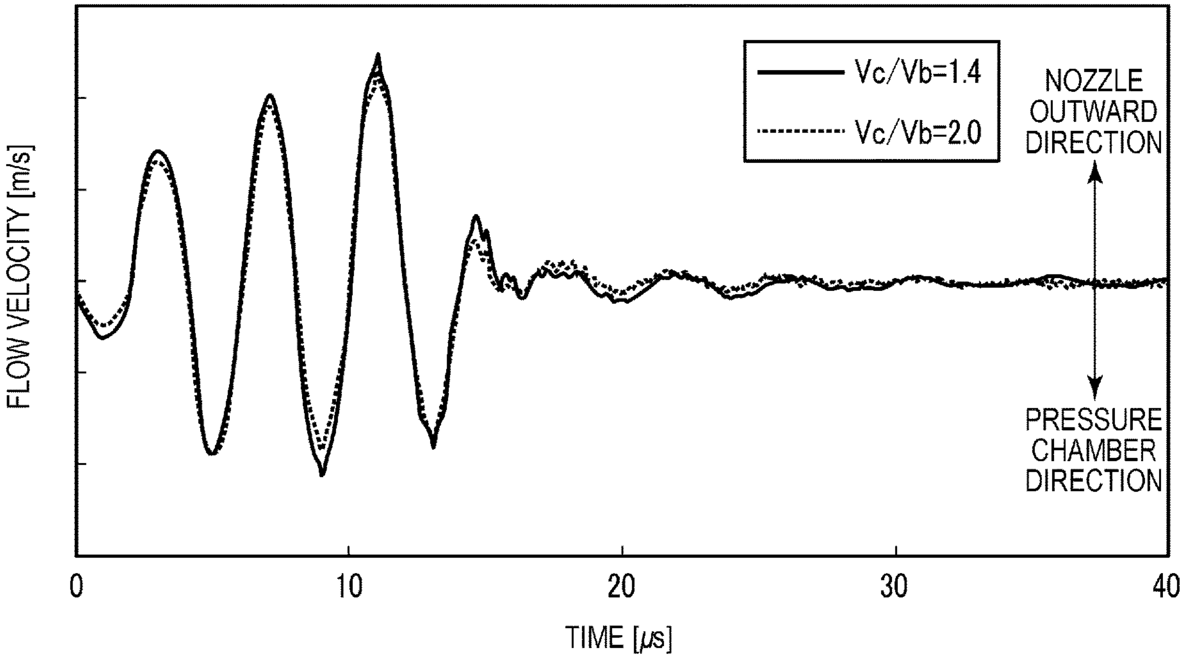
FIG. 13 is a graph illustrating simulation results of a flow velocity in Example 3.
Figure 14:
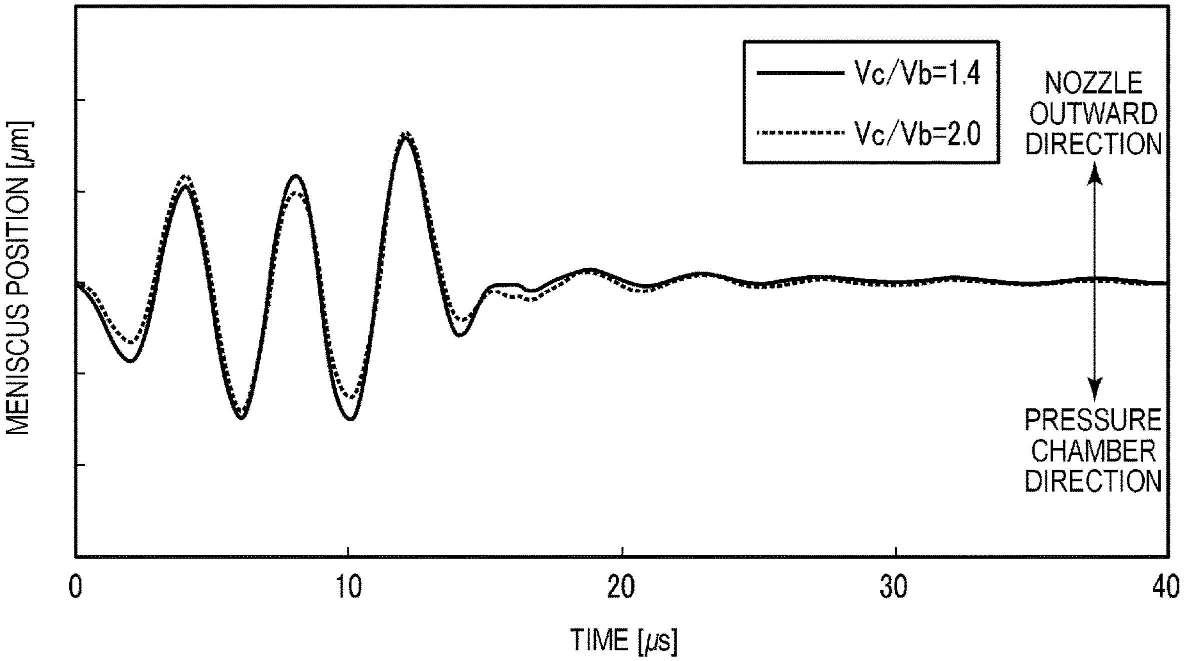
FIG. 14 is a graph illustrating simulation results of a meniscus position in Example 3.

FIGS. 13 and 14 illustrate simulation results if the meniscus is operated at a voltage that does not cause ejection in Example 3. FIG. 13 illustrates the temporal change in the flow velocity if Vc/Vb is 1.4 and if Vc/Vb is 2.0. As a simulation condition, λ is set to 4 μs. FIG. 14 illustrates the temporal change in the meniscus position if Vc/Vb is 1.4 and if Vc/Vb is 2.0. As illustrated in FIGS. 13 and 14, residual vibration can be suppressed by adjusting the voltage ratio Vc/Vb.

Example 4

Figure 15:
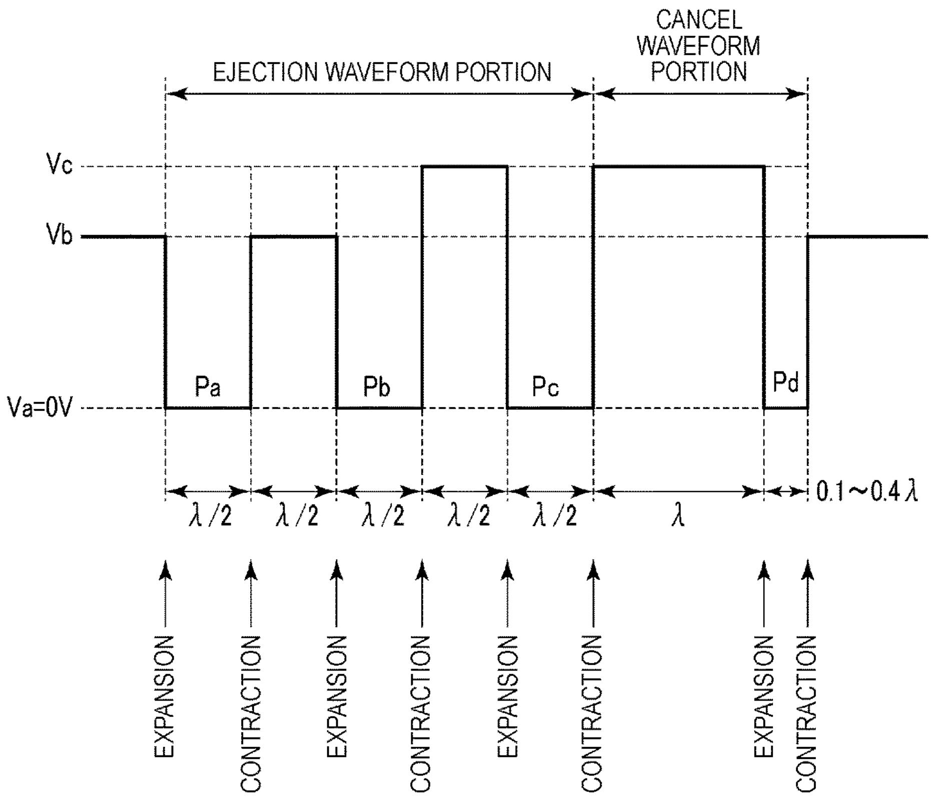
FIG. 15 depicts a drive waveform according to Example 4.

FIG. 15 illustrates the drive waveform of Example 4. The drive waveform of Example 4 is a modification example of the drive waveform of Example 2, and is an example of switching the voltage of the contraction element of Pa and Pb.

The drive waveform of Example 4 is a three-drop waveform, and three ejection pulses for expansion and contraction are aligned at a regular time period λ. Each of the three ejection pulses Pa, Pb, and Pc includes an expansion element that expands the pressure chamber 1131 to draw liquid into the pressure chamber 1131 and a contraction element that contracts the pressure chamber 1131 to eject the liquid. In this example, the first ejection pulse Pa includes an expansion element that lowers the voltage from the first intermediate voltage Vb to the expansion voltage Va and a contraction element that raises the expansion voltage Va to the first intermediate voltage Vb. The second ejection pulse Pb lowers the first intermediate voltage Vb to the expansion voltage Va again, and then raises the expansion voltage Va to the second intermediate voltage Vc larger than the first intermediate voltage Vb. Furthermore, the second intermediate voltage Vc is lowered to the expansion voltage Va in the third ejection pulse Pc, and then raised to the second intermediate voltage Vc again. Other waveforms are the same as in Example 2. Also in this example, stabilization of ink droplet ejection and expansion of the range of gradation can be achieved.

Example 5

Figure 16:
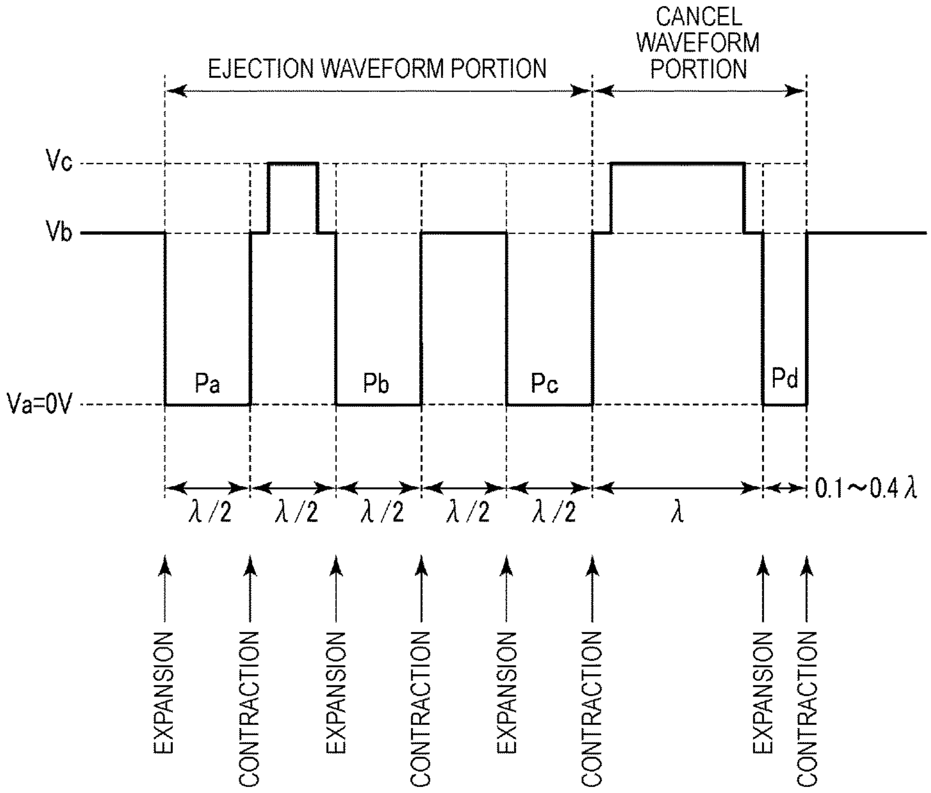
FIG. 16 depicts a drive waveform according to Example 5.

FIG. 16 is a drive waveform of Example 5. The drive waveform of Example 5 is a modification example of the drive waveform of Example 2, and is an example in which Pa and Pb include a step waveform portion that maintains an intermediate voltage for a certain period of time, and a voltage is applied stepwise. In this example, the contraction element of the first ejection pulse Pa has a step waveform that raises the voltage stepwise, and the expansion element of the second ejection pulse Pb has a step waveform that lowers the voltage stepwise.

This drive waveform of Example 5 is a three-drop waveform, and three ejection pulses for expansion and contraction are aligned at a regular time period λ. Each of the three ejection pulses Pa, Pb, and Pc includes an expansion element that expands the pressure chamber 1131 to draw liquid into the pressure chamber 1131 and a contraction element that contracts the pressure chamber 1131 to eject the liquid. In this example, the first ejection pulse Pa includes an expansion element that lowers the voltage from the first intermediate voltage Vb to the expansion voltage Va and a contraction element that raises the expansion voltage Va to the second intermediate voltage Vc, which is larger than the first intermediate voltage Vb, stepwise. For example, the second intermediate voltage Vc is larger than the first intermediate voltage Vb. The first ejection pulse Pa has a step waveform in which the voltage is raised from the expansion voltage Va to the first intermediate voltage Vb, the first intermediate voltage Vb is maintained for a certain period of time, and then the first intermediate voltage Vb is raised to the second intermediate voltage Vc stepwise. In this waveform, the first ejection pulse Pa lowers the voltage from the first intermediate voltage Vb to the expansion voltage Va (=0 V), then raises the voltage to the first intermediate voltage Vb, and further raises the voltage to the second intermediate voltage Vc larger than the first intermediate voltage Vb. The second ejection pulse Pb includes an expansion element that lowers the voltage from the second intermediate voltage Vc to the first intermediate voltage Vb, maintains the first intermediate voltage Vb for a certain period of time, and then further lowers the first intermediate voltage Vb to the expansion voltage Va, and a contraction element that raises the expansion voltage Va to the first intermediate voltage Vb again. The third ejection pulse Pc has the expansion element that lowers the voltage from the first intermediate voltage Vb to the expansion voltage Va, and the contraction element that raises the expansion voltage Va to the first intermediate voltage Vb again.

As illustrated in FIG. 16, the cancel waveform portion of this example has the step waveform that maintains the first intermediate voltage Vb for a certain period of time. Specifically, the cancel waveform portion includes a contraction element that maintains the first intermediate voltage Vb for a certain period of time after raising the expansion voltage Va to the first intermediate voltage Vb in the contraction element of the final ejection pulse Pc and then raises the first intermediate voltage Vb to the second intermediate voltage Vc stepwise, an expansion element that expands the pressure chamber 1131 contracted by the second intermediate voltage Vc again to maintain the state of the first intermediate voltage Vb for a certain period of time, and then changes the first intermediate voltage Vb to the expansion voltage Va in a stepwise manner, and a contraction element that contracts the expanded pressure chamber 1131 again and then returns the expansion voltage Va to the first intermediate voltage Vb.

Other waveforms are the same as in Example 2. Also in this example, stabilization of ink droplet ejection and expansion of the range of gradation can be achieved.

Example 6

Figure 17:
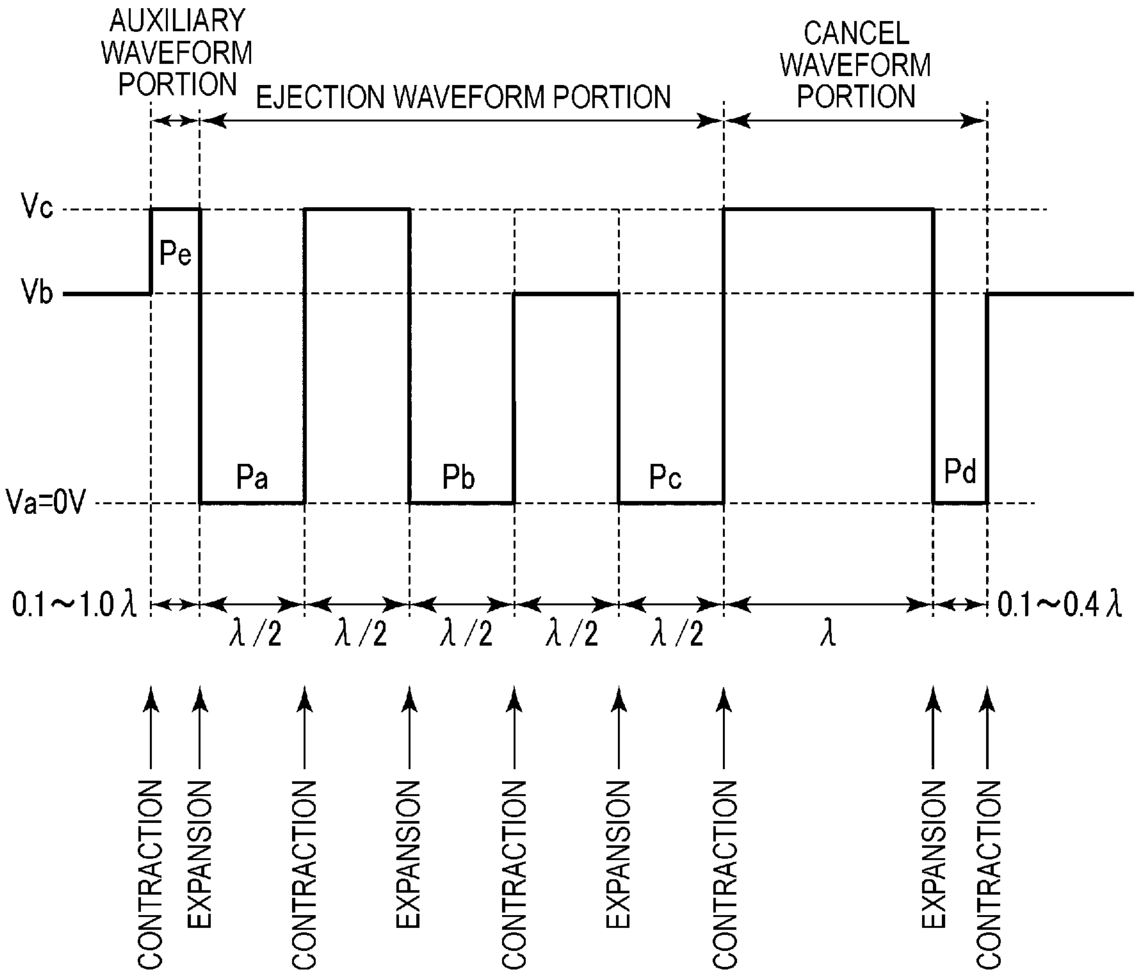
FIG. 17 depicts a drive waveform according to Example 6.

FIG. 17 is a drive waveform of Example 6. The drive waveform of Example 6 is a modification example of the drive waveform of Example 2, and is an example of including an auxiliary waveform portion before the ejection waveform portion. That is, in this example, the auxiliary waveform portion has an auxiliary pulse Pe (including a contraction element that raises the voltage from the first intermediate voltage Vb to the second intermediate voltage Vc) before the expansion element of the first ejection pulse Pa. Other waveforms are the same as in Example 2. The auxiliary pulse can speed up the first drop of ink.

In the liquid ejection head 1 and the liquid ejection apparatus 2, gradation can be provided by raising the intermediate voltage of the contraction element in the ejection pulse. That is, for example, if the voltage of the ejection pulse from the first drop to the (n−1) drop is the same, the size of the ink droplet that can be ejected is limited. Therefore, when printing a multi-gradation image by changing the size of print dots, the range in which the size of the ink droplet can be increased or decreased is fairly narrow, and the expression of gradation is limited. In contrast, according to the examples above, the range of the gradation expression can be expanded by controlling the intermediate voltage in two or more steps (increments). According to those examples, the ejection stability can be ensured by having (n−1) ejection pulses at intervals of 0.8 to 1.2λ, where λ is a period of a primary natural vibration when the pressure chamber is filled with ink. Therefore, both an expansion of the expression range of gradation and ejection stability can be achieved.

The liquid ejection head 1 or the liquid ejection apparatus 2 may have any configuration other than the ones described above.

For example, three-drop gradation is used as an example, but the disclosure is not limited thereto, and four or more-drop may be used. In such cases, steps for the voltage of the contraction element are not limited to two, but may be set to three or more.

The configuration of the liquid ejection head 1 is not limited to the examples described above, and may be used for other types of heads.

According to at least one embodiment described above, both the stabilization of ejection of ink droplets and the expansion of the range of gradation can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle from which a droplet of a liquid can be ejected;

a pressure chamber for the liquid, the pressure chamber connected to the nozzle;

an actuator configured to change a volume of the pressure chamber according to a voltage signal applied to the actuator; and a drive circuit configured to generate the voltage signal that includes (n−1) ejection pulses when droplets are to be ejected n times from the nozzle, where n is an integer of 3 or more, wherein the ejection pulses include:

a first ejection pulse that lowers a voltage applied to the actuator to a first voltage value to expand the pressure chamber and then raises the voltage to a second voltage value to contract the pressure chamber, and a second ejection pulse that lowers the voltage to the first voltage value and then raises the voltage to a third voltage value higher than the second voltage value, the ejection pulses are separated by intervals of 0.8λ to 1.2λ, where λ is a period of a primary natural vibration for the pressure chamber filled with the liquid, the voltage signal further includes a cancel pulse following the ejection pulses, a last ejection pulse of the ejection pulses is the second ejection pulse by which the voltage is raised to the third voltage value, the cancel pulse lowers the voltage to a voltage value lower than the second voltage value and then raises the voltage to the second voltage value, and the cancel pulse is input after the voltage is lowered from the third voltage value to the second voltage value.

2. The liquid ejection head according to claim 1, wherein the cancel pulse raises the voltage to a voltage value higher than the second voltage value and then lowers the voltage to the second voltage value.

3. The liquid ejection head according to claim 2, wherein the voltage value higher than the second voltage value is the third voltage value.

4. The liquid ejection head according to claim 1, wherein the voltage value lower than the secondo voltage value is the first voltage value.

5. The liquid ejection head according to claim 1, wherein the cancel pulse is input upon elapse of the period after the last ejection pulse.

6. The liquid ejection head according to claim 1, wherein one of the ejection pulses changes the voltage stepwise.

7. The liquid ejection head according to claim 1, wherein the voltage signal further includes an auxiliary pulse before the ejection pulses, and the auxiliary pulse raises the voltage to a voltage value higher than the second voltage value and then lowers the voltage to the second voltage value.

8. The liquid ejection head according to claim 7, wherein the voltage value higher than the second voltage value is the third voltage value.

9. The liquid ejection head according to claim 1, wherein the liquid is ink for printing.

10. The liquid ejection head according to claim 9, wherein the droplet ejected n times expresses n different gradation levels.

11. The liquid ejection head according to claim 1, wherein the cancel pulse is input immediately after the voltage is lowered from the third voltage value to the second voltage value.

12. An image forming apparatus, comprising:

a conveyer by which a medium is conveyed; and an image forming unit configured to form an image on the medium and including an ink ejection head that includes:

a nozzle from which a droplet of ink can be ejected, a pressure chamber for the liquid, the pressure chamber connected to the nozzle, an actuator configured to change a volume of the pressure chamber according to a voltage signal applied to the actuator, and a drive circuit configured to generate the voltage signal that includes (n−1) ejection pulses when droplets are to be ejected n times from the nozzle, where n is an integer of 3 or more, wherein the ejection pulses include:

a first ejection pulse that lowers a voltage applied to the actuator to a first voltage value to expand the pressure chamber and then raises the voltage to a second voltage value to contract the pressure chamber, and a second ejection pulse that lowers the voltage to the first voltage value and then raises the voltage to a third voltage value higher than the second voltage value, the ejection pulses are separated by intervals of 0.8λ to 1.2λ, where λ is a period of a primary natural vibration filled with the ink, the voltage signal further includes a cancel pulse following the ejection pulses, a last ejection pulse of the ejection pulses is the second ejection pulse by which the voltage is raised to the third voltage value, the cancel pulse lowers the voltage to a voltage value lower than the second voltage value and then raises the voltage to the second voltage value, and the cancel pulse is input after the voltage is lowered from the third voltage value to the second voltage value.

13. The image forming apparatus according to claim 12, wherein the cancel pulse raises the voltage to a voltage value higher than the second voltage value and then lowers the voltage to the second voltage value.

14. The image forming apparatus according to claim 13, wherein the voltage value higher than the second voltage value is the third voltage value.

15. The image forming apparatus according to claim 12, wherein the voltage value lower than the secondo voltage value is the first voltage value.

16. The image forming apparatus according to claim 12, wherein the cancel pulse is input upon elapse of the period after the last ejection pulse.

17. The image forming apparatus according to claim 12, wherein the cancel pulse is input immediately after the voltage is lowered from the third voltage value to the second voltage value.

* * * * *